Aug. 2, 1966  J. RIEDHAMMER ET AL  3,263,311
PROCESS FOR ASSEMBLING PISTONS AND CONNECTING RODS OF
AXIAL PISTON MACHINES
Filed Feb. 23, 1965
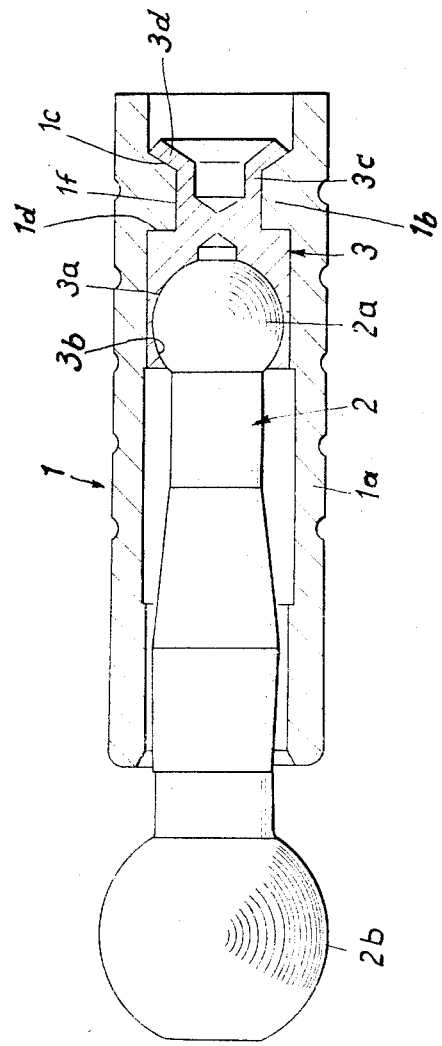
Inventor:

United States Patent Office 3,263,311
Patented August 2, 1966

3,263,311
PROCESS FOR ASSEMBLING PISTONS AND CONNECTING RODS OF AXIAL PISTON MACHINES
Josef Riedhammer, Horb am Neckar, and Josef Kurzeja, Geisweid, Germany, assignors to Stahlwerke Bruninghaus G.m.b.H., Westhofen, Westphalia, Germany
Filed Feb. 23, 1965, Ser. No. 434,473
Claims priority, application Germany, Feb. 21, 1964, St 21,730
10 Claims. (Cl. 29—156.5)

The present invention relates to axial piston machines in general, and more particularly to improved connections between the pistons and connecting rods of such assemblies. Still more particularly, the invention relates to an improved process for assembling connecting rods with trunk type pistons for use in wobble-plate pumps or motors and similar axial piston machines.

U.S. Patent No. 3,163,094, granted to Riedhammer et al. on December 29, 1964, discloses a piston assembly and a process of assembling the same. Our present invention constitutes an improvement over and a further development of the process which is disclosed in said patent. In accordance with the process which is disclosed in the patent to Riedhammer et al., the connection between the spherical end portion of a connecting rod and a trunk type piston comprises a deformable coupling element which may consist of non-alloyed non-hardened steel and is assembled with the spherical end portion prior to or during insertion into the skirt of the piston whereby a suitable projection of the coupling element extends through an aperture provided in a transverse internal wall of the piston. In the next step, the projection is deformed against the wall so that the coupling element resembles a rivet whose heads are located at the opposite sides of the wall. The spherical end portion of the connecting rod is anchored in one of the rivet heads. The deformability of the coupling element remains unchanged prior, during and subsequent to anchoring in the skirt of the piston.

Accordingly, it is an important object of the present invention to provide a process for assembling the connecting rod and the trunk type piston in such a way that the resultant connection between such parts offers very strong resistance to deformation when the assembling operation is completed.

Another object of the invention is to provide a process of the just outlined characteristics according to which the connection between the piston and connecting rod is obtained by resorting to a coupling element whose material is readily deformable during assembly but can be subjected to a very simple treatment which causes substantial increase in the hardness of such material so that the fully assembled connection can readily withstand all stresses which might arise when the resulting assembly is put to use in an axial piston machine or the like.

A further object of the invention is to provide a process for assembling the connecting rod and the piston of an axial piston machine according to which the connection between such parts may be established in response to exertion of comparatively small forces but the connection can be treated in a subsequent step to insure that the ultimate assembly offers exceptionally high resistance to any stresses which would tend to separate the connecting rod from the piston or which would tend to bring about undesirable movements of such parts with reference to each other.

A concomitant object of the invention is to provide a novel piston assembly which is obtained by resorting to a process of the above outlined characteristics.

Briefly stated, one feature of the present invention resides in the provision of a process for coupling the spherical end portion of a connecting rod which preferably consists of nitrided heat-treated steel with a trunk type piston whose skirt is provided with a transversely extending apertured internal wall. The process comprises the steps of forming a deformable one-piece coupling element with a socket at one end and with a projection at the other end thereof whereby the cavity of the socket may receive the spherical end portion of the connecting rod and the projection may extend through and beyond the apertured wall of the piston, permanently retaining the spherical end portion in the cavity of the socket by deforming the socket around the spherical end portion, fully inserting the coupling element into the piston so that the spherical end portion of the connecting rod is adjacent to one side of the wall and the projection extends through and beyond the other side of the wall, deforming the projection against the other side of the wall so that the coupling element is anchored in this wall and simultaneously couples the connecting rod with the piston, and treating the material of the coupling element to improve its resistance to plastic deformation so that it withstands tensional and other types of stresses in the range of at least 120 kg./mm.$^2$ whereby the connection between the piston and connecting rod is capable of resisting all such forces which arise when the resulting assembly is used in an axial piston machine, e.g., in a wobble-plate pump or motor.

In accordance with the present invention, the material of the coupling element is a precipitation hardenable metallic material which is a solid solution within a predetermined temperature range and which becomes soft and readily deformable in response to quenching and resultant cooling to a temperature outside of such range. The coupling element is assembled with the connecting rod and with the piston subsequent to such quenching, i.e., while its material is readily deformable, and the material is thereupon heat treated to improve its resistance to plastic deformation so that the connection between the piston and connecting rod will readily withstand stresses in the range of between 120–180 kg./mm.$^2$ or higher.

The novel features which are considered as characteristic of the invention are set forth in particular in the appended claims. The improved piston assembly itself, however, both as to its construction and the process for assembling the same, together with additional features and advantages thereof, will be best understood upon perusal of the following detailed description of a specific embodiment with reference to the accompanying drawing the single illustration of which is an axial section through a fully assembled connection between a connecting rod and a trunk type piston which is established by resorting to the process of our invention.

Referring to the drawing, the assembly therein shown comprises a trunk type piston 1 which comprises a skirt 1a having a transversely extending internal wall 1b formed with an axially extending aperture 1f. The right-hand side 1c of the wall 1b is of conical shape and diverges in a direction away from the wall. This piston 1 is coupled with a connecting rod 2 whose spherical end portion 2a is adjacent to the left-hand side of the wall 1b and which also comprises a second spherical end portion 2b adapted to be connected to a wobble-plate or the like in a manner as disclosed, for example, in the copending patent application Serial No. 412,355 of Heinz Teubler et al., filed on November 19, 1964, and assigned to the same assignee.

In accordance with the present invention, the connection between the piston 1 and connecting rod 2 is established by a coupling element 3 which consists of a special metallic material capable of being cold-formed into desired shape and also capable of precipitation hardening so that its tensile strength will at least approximate but preferably exceeds 120 kg./mm.$^2$. One end of the coupling element is formed with a socket 3a defining a spherical cavity 3b which accommodates the major part of the spherical end portion 2a, and the external diameter of the socket 3a exceeds the internal diameter of the skirt 1a. The other end of the coupling element 3 is formed with a centrally located projection 3c which is free to extend through and beyond the aperture 1f.

In the first step, the end portion 2a is inserted into the cavity 3b and the coupling element 3 is then inserted through the left-hand end of the skirt 1a whereby the skirt deforms the socket 3a and provides a permanent connection between the connecting rod 2 and coupling element 3. In the next step, the coupling element is pushed against the wall 1b so that its shoulder 1d abuts against the left-hand side of the wall while the projection 3c extends through and beyond the right-hand axial end of the aperture 1f. In a next-following step, the tip 3d of the projection 3c is deformed against the conically diverging side 1c so as to form an enlarged head which causes the coupling element 3 to be anchored in the piston and to simultaneously establish a connection between the piston and the rod 2. In the final step, the material of the coupling element 3 is allowed or caused to precipitation harden so that its tensile strength exceeds 120 kg./mm.$^2$ which is sufficient to prevent uncontrolled movements of the piston with reference to the connecting rod or vice versa and to prevent separation of such parts when the resulting assembly is used in an axial piston machine or the like. The manner in which the coupling element 3 (while in deformable condition) is assembled with the spherical end portion 2a and with the piston 1 is the same as disclosed in the aforementioned U.S. Patent No. 3,163,094.

The material of the coupling element 3 may consist of beryllium-copper bronze whose composition is disclosed on pages 496–498 of a book by Schumann entitled "Metallographie" published in 1958 by Fachbuchverlag Leipzig, Germany. Such types of bronze are readily deformable when quenched so that their temperature drops below a predetermined temperature range within which the material is a solid solution. If precipitation hardened, such materials exhibit a highly satisfactory hardness, i.e., their tensile strength is not less than 120 kg./mm.$^2$.

Alternatively, the material of the coupling element 3 may be a martensitic steel, especially one containing nickel, cobalt and molybdenum. Such types of steel are described, for example, by R. D. Decker, J. T. Eash and A. J. Gildman on pages 58–76 of Trans. Amer. Soc. Met., 55 (1962). Due to their low carbon content, such steels are readily cold-formed subsequent to quenching and while in martensitic state. Once precipitation hardened, they exhibit a tensile strength of at least 120 kg./mm.$^2$ and normally exceeding 180 kg./mm.$^2$.

It will be seen that the process of our present invention provides a very simple solution for problems which arise when the connection between the connecting rod 2 and piston 1 should resist exceptionally high tensile and other stresses. All that is necessary is to precipitation harden the material of the coupling element 3 whereby its deformability decreases to such an extent that the resulting connection is capable of withstanding all stresses which arise in an axial piston machine, for example, in a wobble-plate pump or the like.

The connecting rod 2 preferably consists of heat-treated steel which may but need not be nitrided.

EXAMPLE

In an assembly according to the drawing, the piston 1 and the connecting rod 2 were manufactured of a nitriding steel with the following analysis: .33% C, 1.1% Al and 1.3% Cr. Piston and connecting rod were heat treated by quenching from 860° C. in water and tempering at 620° C. for 3 hours. The strength was 97 kg. per mm.$^2$. The parts were nitrided for 40 hours at 500° C. in ammonia and the surface hardness was 920 Vickers. A martensitic steel capable for precipitation hardening, with the following composition: .02 C, 8% Co, 18% Ni, 4.8% Mo, .4% Ti, .1% Al was solution heat treated at 830° C. and quenched in water. In the martensitic state the coupling element was shaped. Into the cylindrical cavity (3a) of the coupling element 3 the spherical end portion 2a of the connecting rod was introduced and the end portion 3b was cold-deformed into the form shown in the drawing at 3b. The coupling element and the connecting rod thus assembled were introduced into the piston 1. In the next step the coupling element was pushed against the wall 1b so that its shoulder 1d abutted against the left-hand side of the wall while the projection 3c extended through and beyond the right-hand axial end of the aperture 1f. In a next-following step, the tip 3d of the projection 3c was deformed against the conically diverging side 1c so as to form an enlarged head which causes the coupling element 3 to be anchored in the piston and to simultaneously establish a connection between the piston and the rod 2. Finally, the coupling element was heat treated in a vacuum furnace (to prevent oxidation) at 480° C. for 3 hours and quenched in a stream of nitrogen. The surface hardness of the piston and of the connecting rod remain unaltered, whereas the hardness of the coupling element was raised from 100 to 192 kg. per mm.$^2$ due to the precipitation hardening.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. A process for coupling one end portion of a connecting rod with a trunk type piston whose skirt is provided with an internal transversely extending apertured wall, comprising the steps of coupling said end portion with a coupling element which includes a projection arranged to extend through and beyond said apertured wall, said coupling element consisting of a hardenable solid solution of a metallic material in quenched and hence cold-deformable state; inserting said coupling element into the piston so that the end portion of said connecting rod is received in the skirt at one side of said wall and the projection of said coupling element extends through and beyond the other side of said wall; deforming the projection against the other side of said wall so that the coupling element is anchored in the wall and simultaneously couples said connecting rod to said piston; and causing the material of said coupling element to harden by precipitation hardening.

2. A process for coupling one end portion of a connecting rod consisting of heat-treated steel with a trunk type piston whose skirt is provided with an internal transversely extending apertured wall, comprising the steps of coupling said end portion with a coupling element which includes a projection arranged to extend through and beyond said apertured wall, said coupling element consisting of a hardenable solid solution of a metallic material in quenched and hence cold-deformable state; inserting said coupling element into the piston so that the end portion of said connecting rod is received in the skirt at one side of said wall and the projection of said coupling element extends through and beyond the other side of said wall; deforming the projection against the other side of said wall so that the coupling element is anchored in the wall and simultaneously couples said connecting rod to said piston; and causing the material of said coupling element to harden by precipitation hardening.

3. A process as set forth in claim 2, wherein said connecting rod is nitrided.

4. A process for coupling one end portion of a connecting rod with a trunk type piston whose skirt is provided with an internal transversely extending apertured wall, comprising the steps of coupling said end portion with a coupling element which includes a projection arranged to extend through and beyond said apertured wall, said coupling element consisting of a hardenable solid solution of a beryllium-copper bronze in quenched and hence cold-deformable state; inserting said coupling element into the piston so that the end portion of said connecting rod is received in the skirt at one side of said wall and the projection of said coupling element extends through and beyond the other side of said wall; deforming the projection against the other side of said wall so that the coupling element is anchored in the wall and simultaneously couples said connecting rod to said piston; and causing the material of said coupling element to harden by precipitation hardening.

5. A process for coupling one end portion of a connecting rod with a trunk type piston whose skirt is provided with an internal transversely extending apertured wall, comprising the steps of coupling said end portion with a coupling element which includes a projection arranged to extend through and beyond said apertured wall, said coupling element consisting of a hardenable solid solution of a martensitic steel in quenched and hence cold-deformable state; inserting said coupling element into the piston so that the end portion of said connecting rod is received in the skirt at one side of said wall and the projection of said coupling element extends through and beyond the other side of said wall; deforming the projection against the other side of said wall so that the coupling element is anchored in the wall and simultaneously couples said connecting rod to said piston; and causing the material of said coupling element to harden by precipitation hardening.

6. A process as set forth in claim 5, wherein said martensitic steel contains nickel, cobalt and molybdenum.

7. A process for coupling one end portion of a connecting rod with a trunk type piston whose skirt is provided with an internal transversely extending apertured wall, comprising the steps of coupling said end portion with a coupling element which includes a projection arranged to extend through and beyond said apertured wall, said coupling element consisting of a metallic material which is precipitation hardenable to a tensile strength of at least 120 kg./mm.$^2$, which is solution heat treated within a predetermined temperature range, and becomes soft and readily deformable after quenching and which is coupled to said connecting rod subsequent to such quenching but prior to hardening thereof; inserting said coupling element into the piston so that the end portion of said connecting rod is received in the skirt at one side of said wall and the projection of said coupling element extends through and beyond the other side of said wall; deforming the projection against the other side of said wall so that the coupling element is anchored in the wall and simultaneously couples said connecting rod to said piston; and causing the material of said coupling element to harden by precipitation hardening.

8. A process as set forth in claim 7, wherein the end portion of said connecting rod is coupled with said coupling element subsequent to anchoring of said coupling element in the wall of said piston.

9. A process as set forth in claim 7, wherein the end portion of said connecting rod is coupled with said coupling element in response to insertion of the coupling element into said skirt.

10. A process for coupling the spherical end portion of a connecting rod with a trunk type piston whose skirt is provided with a transversely extending internal wall having an aperture therein, comprising the steps of inserting the spherical end portion of said connecting rod into a spherical cavity of a socket at one end of a one-piece coupling element wherein the outer diameter of said socket exceeds the internal diameter of said skirt and which includes a projection provided at the other end thereof and arranged to fit into and to extend beyond the aperture of the wall, said coupling element consisting of a precipitation hardenable metallic material which is solution heat treated and quenched from a predetermined temperature to become soft and cold-formable in response to quenching and which is coupled to said connecting rod and to said piston subsequent to such quenching thereof; inserting the coupling element into the piston so that said socket is deformed around and is thereby coupled with said spherical end portion which is then located in said skirt at one side of said wall and that said projection extends through and beyond said aperture; deforming the projection against the other side of said wall so that the coupling element is anchored in the wall and simultaneously couples the connecting rod to said piston; and precipitation hardening the material of said coupling element so that its tensile strength at least approaches 120 kg./mm.$^2$.

References Cited by the Examiner

UNITED STATES PATENTS 3,163,094   12/1964   Riedhammer _____ 92—208
3,166,828   1/1965    Tupper _____ 29—512
3,191,264   6/1965    Underwood et al. ___ 29—149.5

JOHN F. CAMPBELL, Primary Examiner.

THOMAS H. EAGER, Examiner.